United States Patent [19]
McGregor et al.

[11] Patent Number: 5,979,512
[45] Date of Patent: Nov. 9, 1999

[54] TOP-OFF AND WEIGHING APPARATUS FOR FILLING BAGS

[75] Inventors: Harold R. McGregor, Owatonna; James R. McGregor, Lakeville; LaVern Wobschall; Kurt Snaza, both of Owatonna, all of Minn.

[73] Assignee: Slidell, Inc., Owatonna, Minn.

[21] Appl. No.: 09/128,866

[22] Filed: Aug. 4, 1998

Related U.S. Application Data

[60] Provisional application No. 60/054,791, Aug. 5, 1997.

[51] Int. Cl.$^6$ ........................................................ B65B 1/30
[52] U.S. Cl. ................................ 141/83; 141/10; 141/114; 141/129; 141/313; 53/502; 177/116; 177/160
[58] Field of Search ................................ 141/83, 10, 114, 141/129, 156, 157, 166, 168, 313, 317, 314, 315; 53/502; 177/116, 160, 119

[56] References Cited

U.S. PATENT DOCUMENTS

| | | |
|---|---|---|
| 3,464,508 | 9/1969 | Engle et al. . |
| 4,481,985 | 11/1984 | Bruder et al. ............................... 141/83 |
| 4,676,284 | 6/1987 | DeCrane ................................. 141/114 |
| 5,115,619 | 5/1992 | Lieder ....................................... 141/83 |
| 5,400,837 | 3/1995 | Kelley et al. . |
| 5,753,868 | 5/1998 | Diem ......................................... 177/70 |

FOREIGN PATENT DOCUMENTS

| | | |
|---|---|---|
| 3640520 | 11/1986 | Germany . |
| 539044 | 4/1993 | United Kingdom ...................... 141/83 |

OTHER PUBLICATIONS

P–1000 Bulk Bag Filling System Stone Container Corporation, Single Station Bulk Bag Filling Apparatus having a Platform Weighing Scale.

S–1000 Bulk Bag Filling System Stone Container Corporation, Single Station Bulk Bag Filling Apparatus having Suspended Load Cells.

Slidell 9303 Net Weigh Scale, Slidell, Inc. (Assignee of present application), Two Stage Bag Filling and Weighing Machine.

Slidell 9700 Vibra–Pak, Single Stage Bag Filling and Weighing Machine.

*Primary Examiner*—Henry J. Recla
*Assistant Examiner*—Khoa D. Huynh
*Attorney, Agent, or Firm*—Moore & Hansen

[57] ABSTRACT

A device for topping-off a substantially filled bag with a final charge of particulate material to provide a predetermined final charge weight in the bag is herein disclosed. The device comprises a lower frame supported upon a plurality of load cells and an upper frame supported above the lower frame also upon a plurality of load cells. The upper frame has rotatably suspended therefrom a pair of carriage assemblies which support respective housings. Each of the housings has disposed therein a belt capable of linear motion. The belts are exposed on an inner face of each of the housings such that when the carriage assemblies are rotated toward one another, the respective belts meet one another and are able to engage the opposed faces of a bag. A plurality of bag grasping means are mounted upon the respective housings so as to be able to grasp and hold the opposed faces of the bag received between the belts to open the bag as the housings are rotated away from one another. A filling structure is supported independent of the upper and lower frames and is arranged to supply a charge of particulate material to the open bag. A signal processor for integrating electrical signals from the plurality of load cells of the respective upper and lower frames calculates an actual weight of the bag, determines the difference between the actual weight of the bag and the desired final charge weight of the bag, and directs the filling structure to supply the charge of particulate material to the bag to attain the final charge weight.

20 Claims, 17 Drawing Sheets

TOP-OFF AND WEIGHING APPARATUS FOR FILLING BAGS

This application claims benefit of Provisional Appln. 60/054,791 filed Aug. 5, 1997.

BACKGROUND OF THE INVENTION

This invention relates to bag filling machines, and in particular to apparatus for topping-off a substantially filled bag with a final charge of particulate material to provide a predetermined, total weight charge in the bag.

In the course of filling particulate material into bags from a dispensing spout connected to a supply hopper, it is common practice to initially fill the bag in a bulk fill operation at a relatively high speed. A final charge of material is subsequently delivered into the bag to provide a total charge weight within a bag of particular volume or weight size. One such machine is of the vertical, bottom-fill auger type as disclosed in U.S. Pat. No. 5,109,894 issued to Harold R. McGregor, one of the named co-inventors on this application. As disclosed in that patent, the same, relatively high speed and relatively large diameter auger utilized for bulk feed of the initial charge of material into a bag is also utilized to top off the bag with a final charge of material. Load cells provided on the fill spout provide a reading of the initial weight charge delivered into the bag; and, thereafter, a computer or central processing unit (CPU) actuates the same fill auger at a slower speed, in response to a read-out of the initial weight charge, for a predetermined time or a predetermined number of revolutions of the auger to top off the bag.

Such a total fill system suffers from several problems. First of all, an undue time delay is caused by holding the same bag on the main filling spout while a single set of load cells record the initially filled weight of the bag, after which a computer receives and processes that filled weight data and thereafter actuates the bulk auger, at a slower speed, for a calculated number of revolutions to deliver the final charge into the bag. The total fill time is further extended by the time required to lift the vertical fill auger out of the material in the bag, and to thereafter lower the bag from the spout. Secondly, it is very difficult to obtain the required, precise control of the discharge of the slight amount of particulate material, e.g., one to three pounds, for accurately topping off the bag to the total, predetermined charge weight desired.

Machines for filling particulate material into bags in two stages are also known. Such machines dispense an initial, bulk charge of material into the bag at a relatively high speed, from a dispensing spout. The bag is then moved to a separate location where the final, small, top-off charge of material is added to the bag. However, such machines as presently known have several disadvantages. The load cell or weighing mechanism utilized at the top-off location is not sufficiently accurate; and, the total bag fill time is further extended by the use of a separate set of reforming devices to reform the bag top as it is moved to the top-off location.

With these disadvantages of bag filling and weighing apparatus in mind, an improved bag top-off and weighing apparatus has been developed which greatly reduces the total bag filling time while accomplishing the dispensing of the final, top-off charge of material into the bag with high precision and accuracy.

BRIEF SUMMARY OF THE INVENTION

This invention has as its primary objective the accurate and high speed dispensing of a top-off charge of particulate material into bags which have been substantially filled with an initial, weighed charge.

This basic objective is realized by providing a top-off station having two sets of load cells. A bag containing the initial, bulk charge of material is delivered into the top-off station where most of the weight of the substantially filled bag is registered on a first set of load cells. A second set of load cells, preferably mounted at an elevated level on a frame assembly of the top-off station, registers and weighs the final, top-off charge dispensed into the top of the partially filled bag. For a desired, total bag material weight of 100 pounds, the top-off charge delivered would be on the order of one to three pounds. With only that portion of the total charge weight registered and controlled by the upper set of load cells, a computer or CPU will read the composite weight factors comprised of the main bulk weight of material registered on the bottom load cells and the additional, small weight portion registered on the upper load cells and accurately control the delivery of the top-off charge from a supplemental hopper and spout.

Preferably, the first set of load cells registering the main portion of the bulk weight of the material in the bag is located under a receiving conveyor at the top-off station.

As a particularly beneficial feature, the mouth of the substantially filled bag is gripped and held on the opposite sides of the bag as it is received in the top-off station. The gripping apparatus may take various forms, and preferably comprises a set of two, opposed vacuum devices adjacent the opposite faces of the bag side walls, near the top of the bag. Those bag mouth gripping devices are suspended from the upper or second set of load cells and serve to transfer a very small portion of the weight to those load cells.

As a further, particularly advantageous feature, the aforesaid bag mouth gripping devices, preferably comprising vacuum grippers, will be located at a level to receive and engage the opposite faces of the bag mouth as the substantially filled bag is delivered from the initial, bulk-filling station. Those gripping devices serve to maintain complete, mechanical control of the bag top during the topping off operation so that the bag top segment remains upright, and at the desired same height for properly entering a bag top sealer or closer, to which the totally filled bag is conveyed after the top-off operation.

Particular accuracy in delivering a small, top-off charge of fine, compressible powders is accomplished by utilizing a relatively small, vertical fill auger of less than three inches in diameter, in comparison with the relatively large, bulk fill auger which is normally on the order of five to seven inches in diameter. The small, top-off auger also operates at a relatively low speed on the order of 75 to 100 rpm, in comparison with the relatively high speed of 500–600 rpm at which the bulk fill auger operates. The lower speed and smaller diameter of the top-off auger permits precise metering of the top-off charge.

Particulate material conveying devices, other than a vertical auger, may be used to deliver the top-off charge into a bag. For example, a vibrating feed tray is effective to convey particulate material such as flour, and horizontal augers may be used to deliver easily fluidized materials.

These and other objects and advantages of the invention will be readily understood as the following drawings are viewed in conjunction with the accompanying technical description wherein like reference numerals have been used to designate like elements throughout the several views.

DESCRIPTION OF THE PREFERRED EMBODIMENTS

Figure 1:
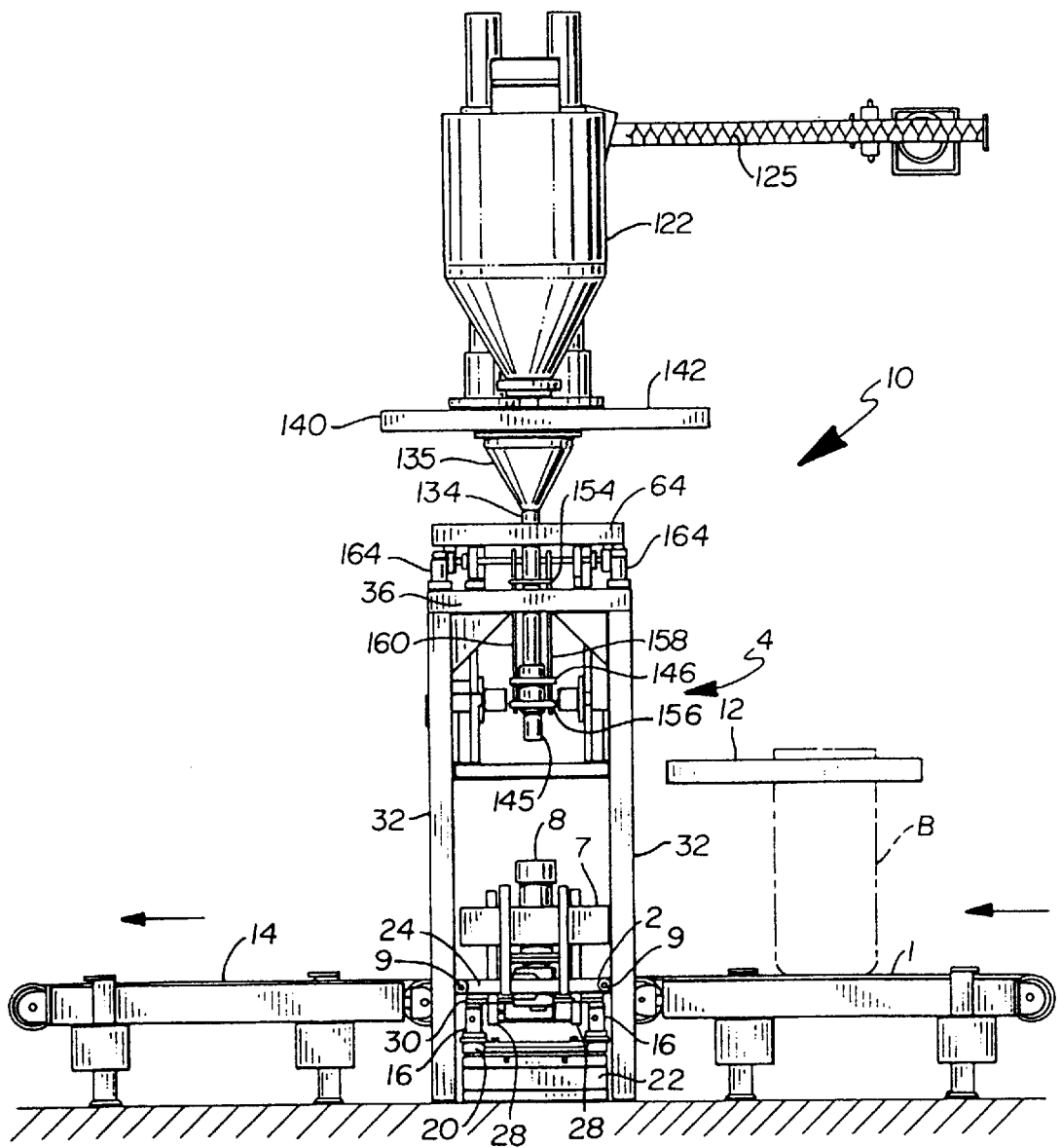
FIG. 1 is a front elevation view of the bag top-off and weighing apparatus of this invention, in combination with delivery and discharge conveyors.
Figure 2:
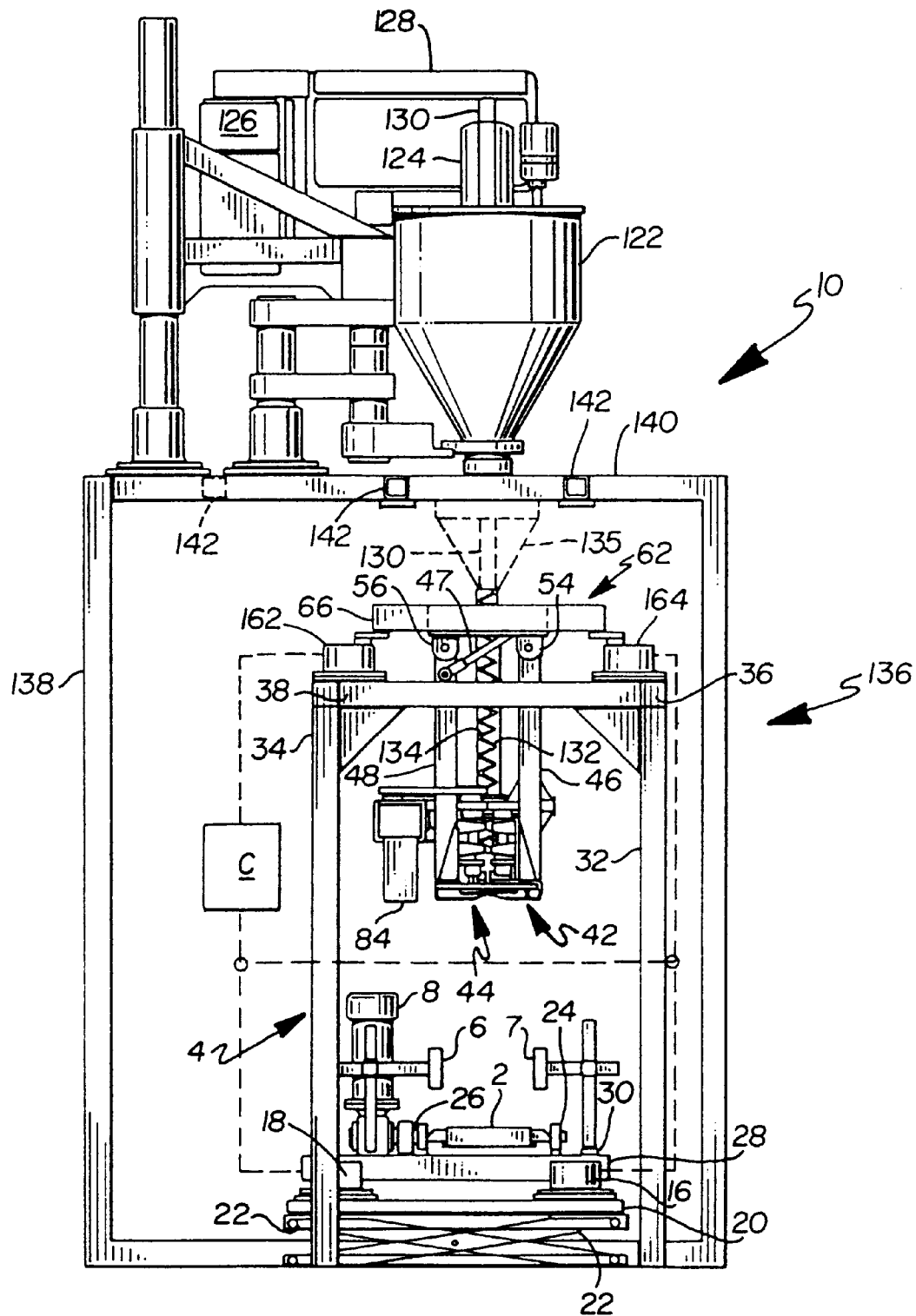
FIG. 2 is left side, elevation view of the apparatus of FIG. 1.

Referring now to the drawings, there is shown in FIGS. 1 and 2 the overall assembly which comprises the bag top-off and weighing apparatus of this invention. A delivery conveyor 1 is utilized to receive bags initially charged in a bulk fill operation. Such bulk filling may be accomplished in various known ways, such as by a vertical auger bag filling machine or by a spout of a clam shell type of bag filling machine on which a bag mouth may be clamped for filling, prior to opening the spout for discharge of material into the bag from a hopper. A bag filling machine of the vertical auger type is disclosed in U.S. Pat. No. 5,109,894 and a bag filling machine of the clam shell type is disclosed in U.S. Pat. No. 4,322,932. Both patents, U.S. Pat. Nos. 4,322,932 and 5,109,894, are commonly with the present invention and are hereby incorporated by reference.

Such substantially filled bags are delivered one at a time onto a receiving conveyor 2 mounted at the lower end of a frame assembly 4. Guide plates 6 and 7 serve to guide the bag onto conveyor 2 from delivery conveyor 1. Conveyor 2 is driven by a motor 8 through a standard gear reduction drive, by imparting driving power to one of the conveyor rotary shafts 9. In transit from the bulk filling machine, a substantially filled bag will be conveyed in an upright position as is indicated with respect to the bag B shown in FIG. 1. At all times from the time that the bag receives its initial bulk fill, to the time that the bag is topped-off by a final fill at the top-off station 10, the bag mouth at its upper end is gripped and held on its opposite sides so as to maintain complete, mechanical control of the bag during the topping-off operation. This insures that the bag top segment remains upright, and at the proper level for filling at the top-off station 10. For that purpose, a pair of elevated end-feed plates 12 are located as shown in FIG. 1 so as to straddle the bag mouth and guide the upper end of the bag into the top-off station 10. Preferably, bag transfer and forming arms as disclosed in U.S. Pat. No. 4,322,932 will be utilized to hold and guide the bag top from the time that it leaves the bulk filling machine, to the time it is received onto conveyor 1 and guided into the top-off station on receiving conveyor 2.

An exit or discharge conveyor 14 is positioned at the output side of top-off station 10 to receive a fully topped-off bag from conveyor 2. Preferably, conveyors 1, 2, and 14 are all belt conveyors of well known construction and operation.

A first set of lower load cells 16, 18 are provided to sense and record the major portion of a bulk-filled bag as it arrives from delivery conveyor 1 onto receiving conveyor 2 of the top-off station 10. Four such load cells are preferably utilized, with two such load cells 16 being on the front side of the machine, and two such load cells 18 at the rear side of the machine, as viewed in FIGS. 1 and 2. Load cells 16–18 are supported on load cell frame members 20. Those frame members are in turn supported on a scissors lift generally indicated by reference numeral 22. Scissors lift 22 may be elevated as desired to accommodate bags of different height. That is done because the bags are not elevated from conveyor bed 2 during the top-off operation, and the top of the bag must be at a level for gripping and filling by an overhead bag gripping and carriage assembly hereinafter described.

Conveyor 2 has side frame bars 24 and 26 which support the end rollers for the conveyor belt, and which are in turn supported on horizontal cross beams 28. In order to transfer the weight of conveyor 2, and thus of bulk-filled bags resting on that conveyor, transverse beams 30 extend across the top of beams 28, and bear on top of load cells 16, 18, at their outer ends. Cross beams 28 are secured to, as by bolts or welding, and suspended below, transverse beams 30.

Frame assembly 4 is comprised of upright legs 32, 34, connected by horizontal support beams 36 and 38 at their upper ends.

Figure 3:
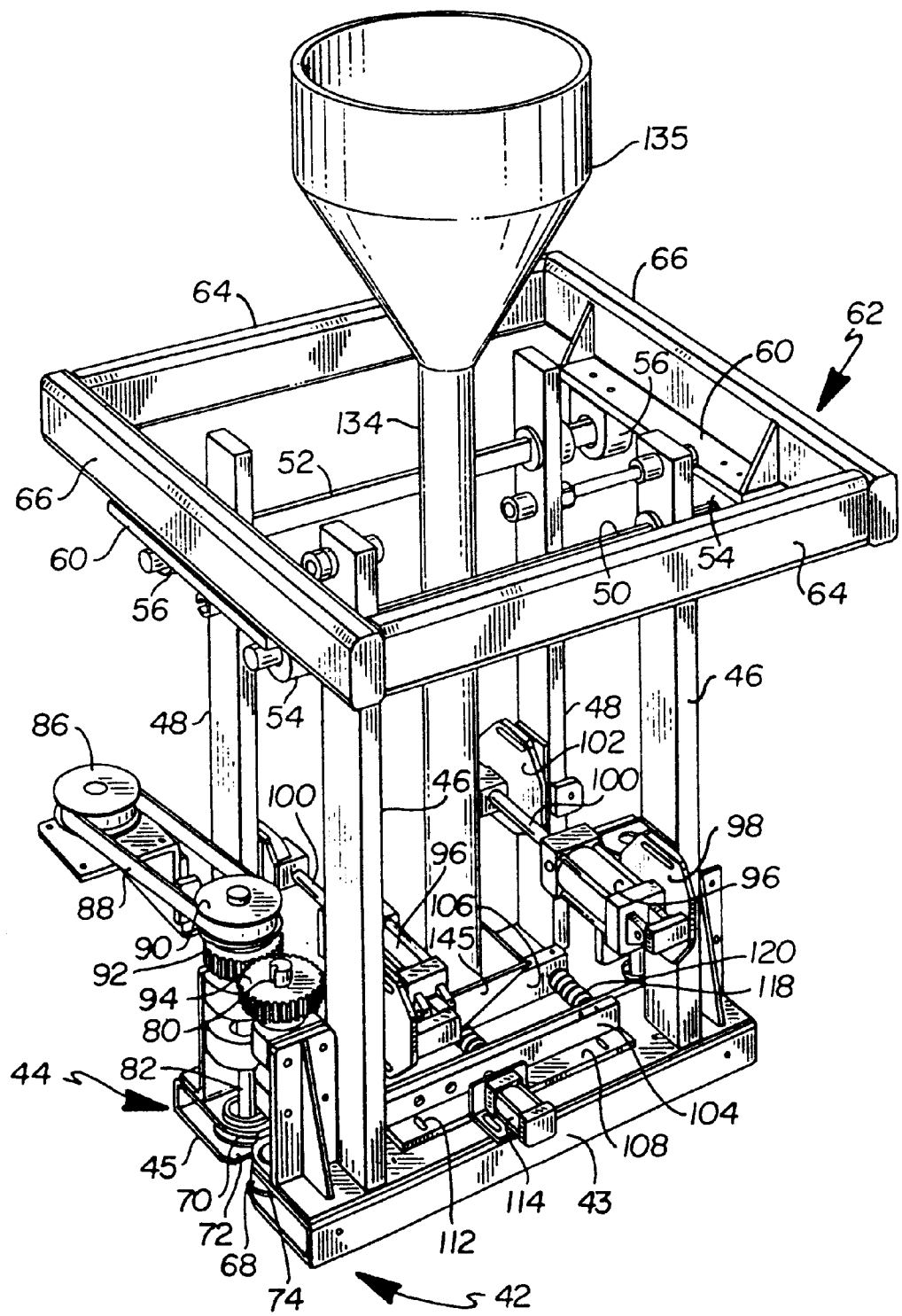
FIG. 3 is a left side perspective view of the elevated, bag guide carriage and opening assembly, with components removed for clarity.
Figure 5:
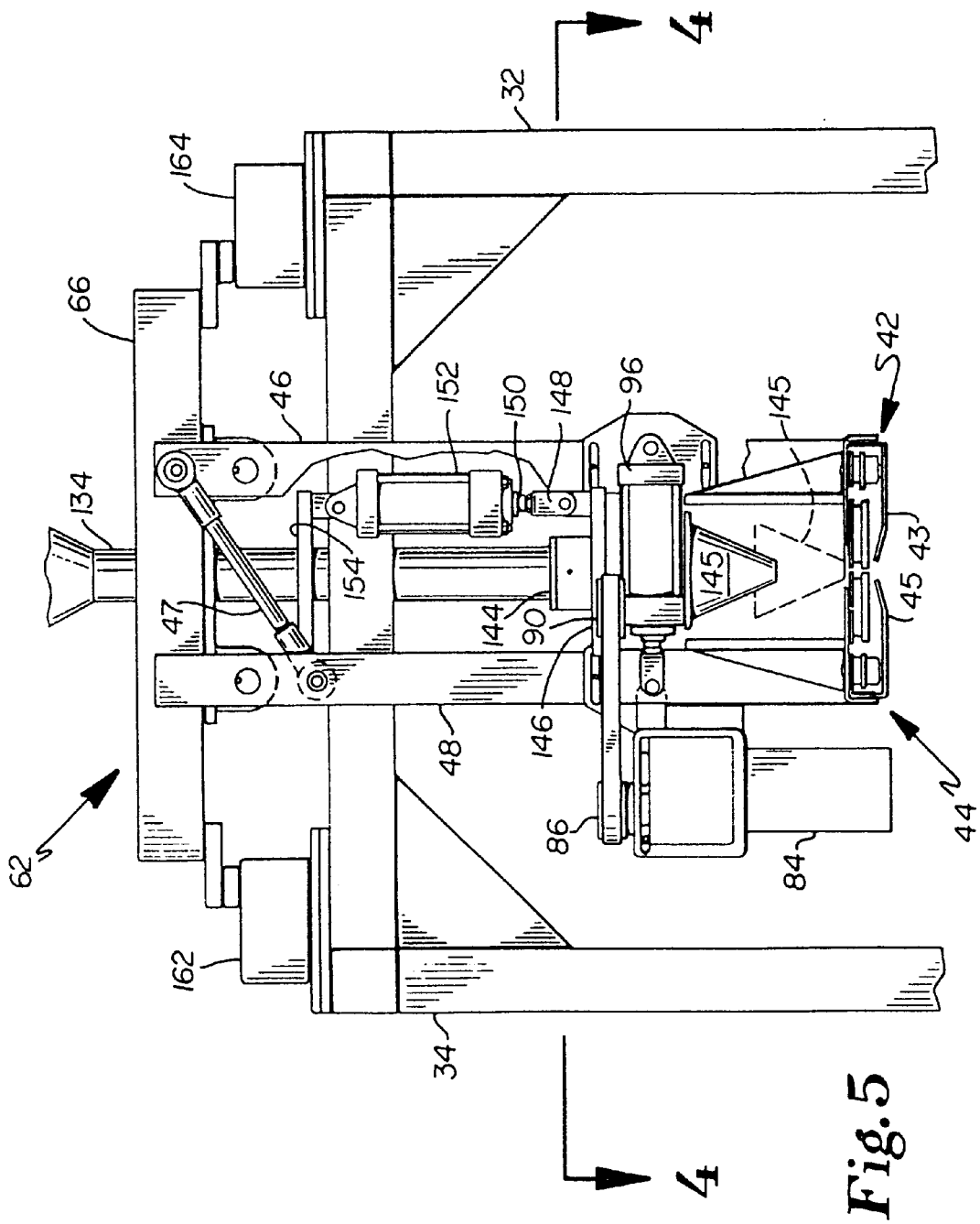
FIG. 5 is an enlarged scale, fragmentary left side view showing the upper load cell mounting arrangement for the bag guide carriage.
Figure 6:
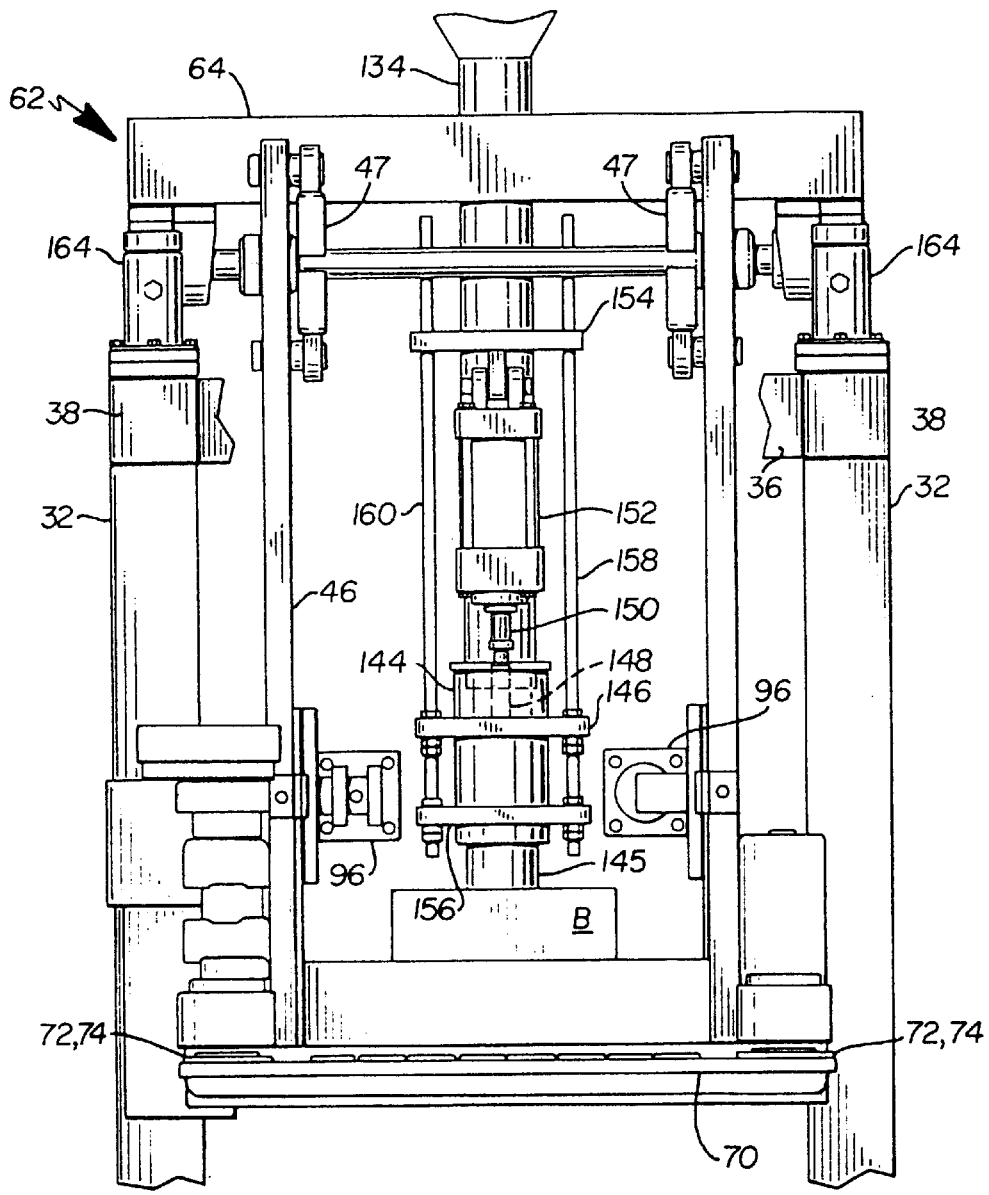
FIG. 6 is an enlarged scale, fragmentary, front view showing the elevated, bag guide carriage and fill tube as viewed in FIG. 1.

The aforesaid frame assembly 4 supports from its top end a pair of swingable or pivotal carriage assemblies 42 and 44, which carry gripping and bag opening mechanisms which may best be understood by reference to FIGS. 3 and 5. Each of the carriage assemblies 42 and 44 are pivotally supported from the lower ends of vertically extending pivot legs 46, 48. Those pivot legs are swingably or pivotally mounted at their upper ends on horizontally extending pivot shafts 50 and 52 supported at their opposite ends within bearings 54 and 56. Those bearings are in turn suspended from support brackets 58 and 60 welded or otherwise secured to a top, load cell frame generally indicated by reference numeral 62. That frame is comprised of horizontal beams 64 and 66 secured together, as by welding or bolting, in a rectangular configuration as shown.

Figure 4:
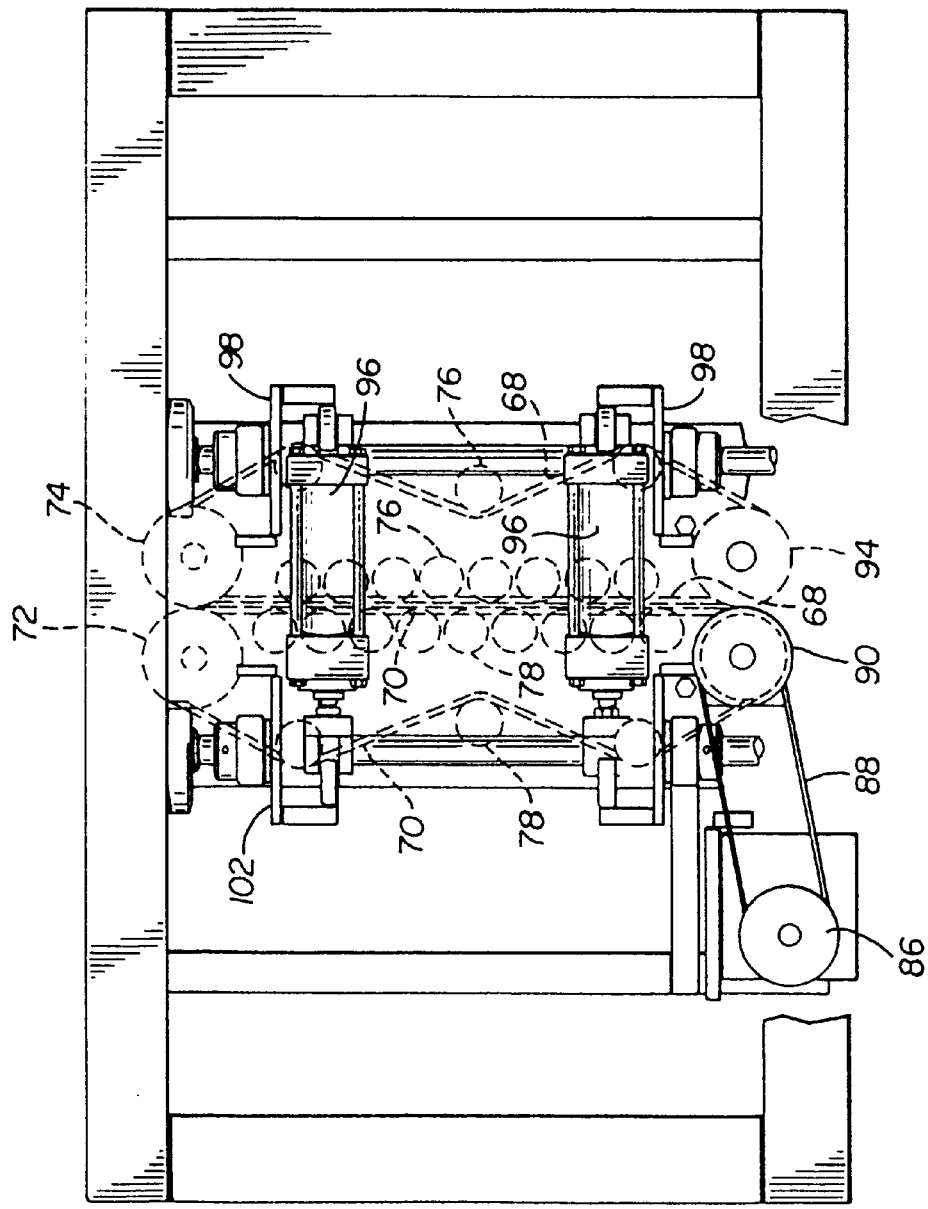
FIG. 4 is a horizontal section view taken along lines 4—4 of FIG. 5 and showing the bag guide belt assembly.

Carriages 42 and 44 are comprised of housings 43 and 45 which enclose a pair of belts 68 and 70 configured in closed loops as shown in FIGS. 3 and 4. Belts 68 and 70 are driven by pulleys 72, 74, and are guided around a plurality of idler pulleys 76 and 78. Belts 68 and 70 are guided around a second pair of primary pulleys at the opposite end of housings 43 and 45 from drive pulleys 72 and 74. Vertical drive shafts 80 and 82 for drive pulleys 72 and 74 receive rotatable, driving power from a motor 84 having its output shaft connected to a pulley 86. A drive belt 88 from pulley 86 connected around a pulley 90 supplies rotary power to pulley shaft 82; and a spur gear 92 mounted on shaft 82 drives a mating spur gear 94 on the other pulley drive shaft 80. In this way, driving power is provided to the pair of looped, bag-gripping belts 68 and 70.

In order to swing carriages 42 and 44 inwardly and outwardly between corresponding closed and open positions for alternately receiving and gripping the upper end or top of bags, one or more, double-acting power cylinders 96 are utilized. Cylinder(s) 96 is attached to one of the pivot legs 46, as by a mounting bracket 98, and has its reciprocal piston 100 connected at its outer end to the oppositely disposed pivot leg 48 by a corresponding bracket 102. Thus, as cylinder 96 is actuated to extend its piston 100, the front and rear pivot carriages 42 and 44 are swung apart to an open position to receive a bag. The retraction of piston 100 pulls the carriages towards each other to the closed, bag-gripping position shown in FIG. 3. One or more tie rods 47 may be connected between pivot legs 46, 48 so as to constrain the pivot legs to rotate in symmetry with one another as the cylinder(s) 96 rotate the pivot legs 46, 48 towards and away from one another.

Various types of gripping devices may be utilized to firmly engage and grip the bag top for opening it, upon the outward swinging and opening movement of the carriages 42 and 44. Such gripping devices are carried on the respective carriages 42 and 44. For example, a pair of oppositely disposed vacuum belts may be utilized, or suction cups connected to vacuum manifolds may be satisfactorily employed. The latter form of gripping devices are illustrated in the drawings. As is shown in FIG. 3, a pair of oppositely disposed, vacuum manifolds 104 and 106 are slidably mounted on the top faces of carriage housings 43 and 45 by way of their apertured bracket plates 108 and 110. Bolts (not shown) are secured through apertures 112 onto the carriage housings 43 and 45. A pair of double-acting, power cylinders 114 and 116 as shown in FIGS. 3 are also mounted on the top of belt housings 42 and 45 and secured to vacuum manifolds 104 and 106. A plurality of vacuum cups 118, 120 are mounted on the inside faces of each of the manifolds 104 and 106 in opposed relation to each other. Vacuum manifolds 104 and 106 are connected to a vacuum source, through which a vacuum is induced in vacuum cups 118 and 120.

An auxiliary supply hopper 122 is provided as shown in FIGS. 1 and 2, as a source of supply for the top-off charge. Hopper 122 has a receiving tube 124, into which the charge material is delivered from an auxiliary supply auger 125. That auger may be connected to the main supply hopper utilized for storing the material initially filled into a bag in the bulk filling operation which precedes the top-off filling accomplished by top-off station 10. In the embodiment shown in FIGS. 1–6, the top-off filling or charging of a bag is accomplished by a vertical auger 132 having a drive shaft 130. Rotary power is supplied to that drive shaft from a motor 126 by way of a pulley and drive belt system of conventional design, and which is generally indicated by reference numeral 128. Fill auger 132 is contained within an outer, stationary auger tube 134 which extends as shown in FIGS. 1 and 2 from the bottom of a supply spout 135 under hopper 122.

Hopper 122 and its supply assembly are mounted on top of an outer frame assembly 136 having vertical frame legs 138 and horizontal frame beams 140 and 142.

The discharge of material from the bottom of auger tube 134 is accomplished through a vertically slidable tube or cylindrical segment 144, which carries a wedge or funnel-shaped discharge spout 145 on its bottom end. Slide tube or sleeve 144 is vertically slidable up and down on auger tube 134 in order to raise and lower discharge funnel 145 out of and into the open mouth at the top of a bag presented on conveyor 2 for top-off filling. For that purpose, sleeve 144 is secured to a pair of vertically spaced clamping rings 146 and 156 slidably mounted on vertical guide rods 158 and 160. Vertical movement of slide sleeve 144 is accomplished by a double-acting, power cylinder 152 having a piston 150. The lower end of piston 150 is connected to an ear 148 projecting upwardly from slide ring 146. Cylinder 152 is pivotally mounted as shown in FIGS. 1 and 2 to a fixed mounting ring 154. Clamping rings 146, 156 and fixed mounting rings 154 are arranged so as to support the discharge funnel 145 independent of frames 4 and 62.

In order to weigh and register the top-off charge introduced into the top of a bag, a second set of upper load cells 162, 164 are provided. Four such load cells are shown in this embodiment, mounted on top of horizontal frame beams 36 and 38 of the frame assembly 4. The uppermost frame assembly 62 as shown most clearly in FIG. 3 and as also appears in FIGS. 5 and 6 receives the weight of the swing carriages 42 and 44, through the pivotal suspension of vertical legs 46, 48 therefrom on bearings 54, 56, as described above. Thus, with upper frame assembly 62 having its side beams 64 and 66 resting on top of upper load cells 162, 164, the weight of the swing carriages 42 and 44 is transmitted to those upper load cells. With the suction cups 118 and 120 gripping the top end of a bag on the opposite sides of its mouth and holding the bag during a filling operation as described below, the top-off charge weight received in the top of the bag will also be transmitted through carriages 42 and 44 to upper load cells 162 and 164.

FIGS. 7–10 disclose another embodiment of the top-off weigh station. In this embodiment, the basic construction and operation of the top-off and weighing apparatus is the same as described above with respect to FIGS. 1–6. In particular, the lower portion of the apparatus is the same, including in-feed conveyor 1, receiving conveyor 2, and discharge or outlet conveyor 14. Also, the arrangement of the lower load cells under the receiving conveyor is the same as in the previously described embodiment. The differences relate to the mounting and disposition of the upper load cells, as well as for the pivotal carriages 42 and 44. The overall height of the frame assembly 4 has been reduced, so as to dispose the carriage assemblies 42, 44 at a lower level. Also, the vertical height of the pivotal carriage legs 46, 48 has been reduced. These factors have all contributed to lowering the center of gravity of the apparatus and stabilizing the load from the pivotal carriages 42, 44 on the upper load cells.

That load stabilization on the upper load cells has also been enhanced by changing and relocating the motor drive for the bag guide belts 68, 70; and also changing the actuating cylinder arrangement for swinging the pivotal carriages 42 and 44 inwardly and outwardly.

Figure 8:
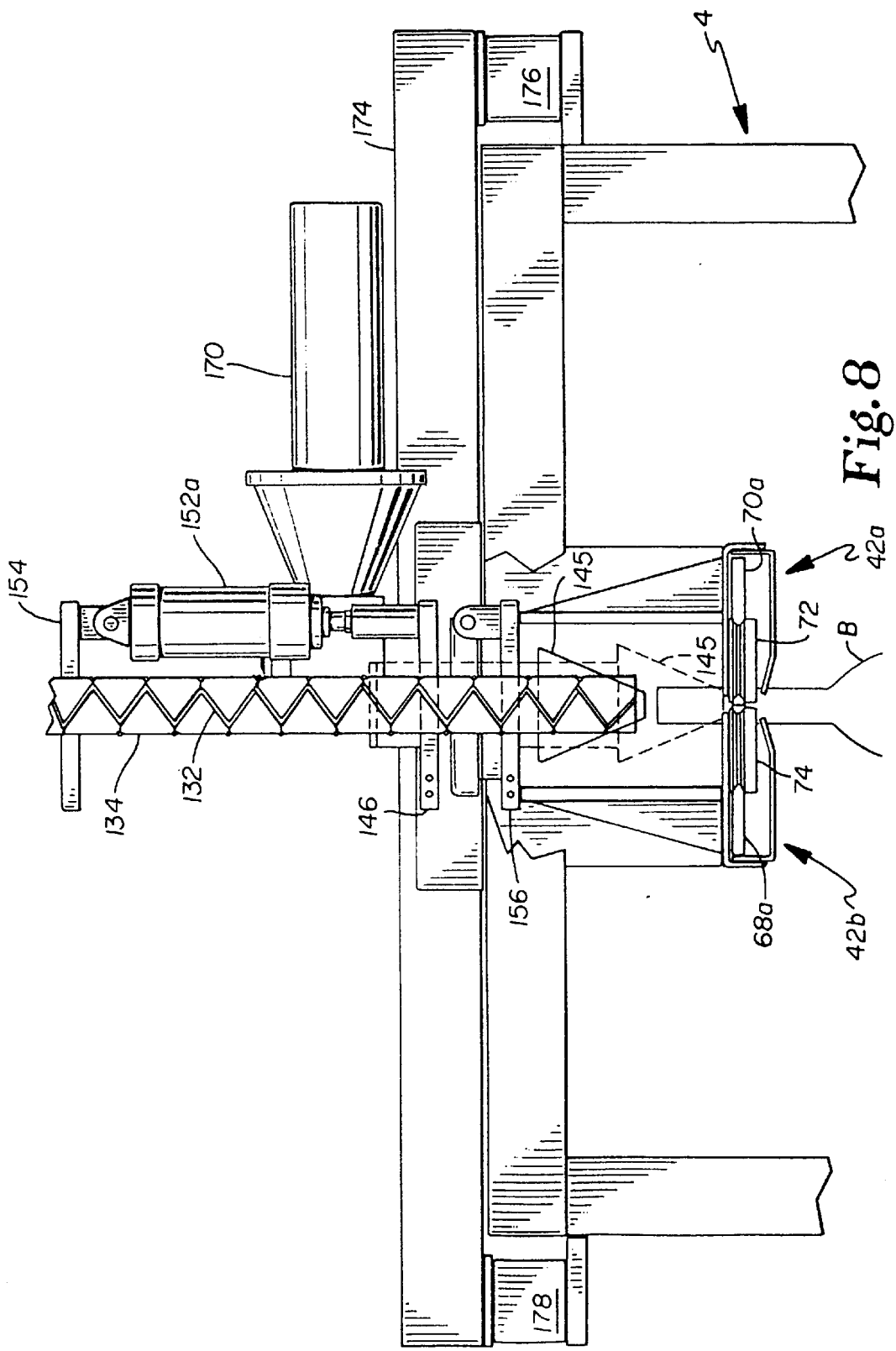
FIG. 8 is a left side, elevation view of the apparatus of FIG. 7.

As shown in FIG. 8, the pivotal legs 46a, 48a have been substantially shortened with respect to the similar scale embodiment shown in FIGS. 1–6. This has minimized the "pendulum" effect on the upper load cells when the bag-opening carriages 42 and 44 swing open. The drive motor for the belts 68 and 70 has been moved inwardly when viewing the apparatus as shown in FIG. 8, closer to the center of gravity of the entire apparatus, and a belt-gear motor 170 has been used in place of the electric motor and drive belt arrangement shown in the embodiment of FIGS. 1–6.

Figure 9:
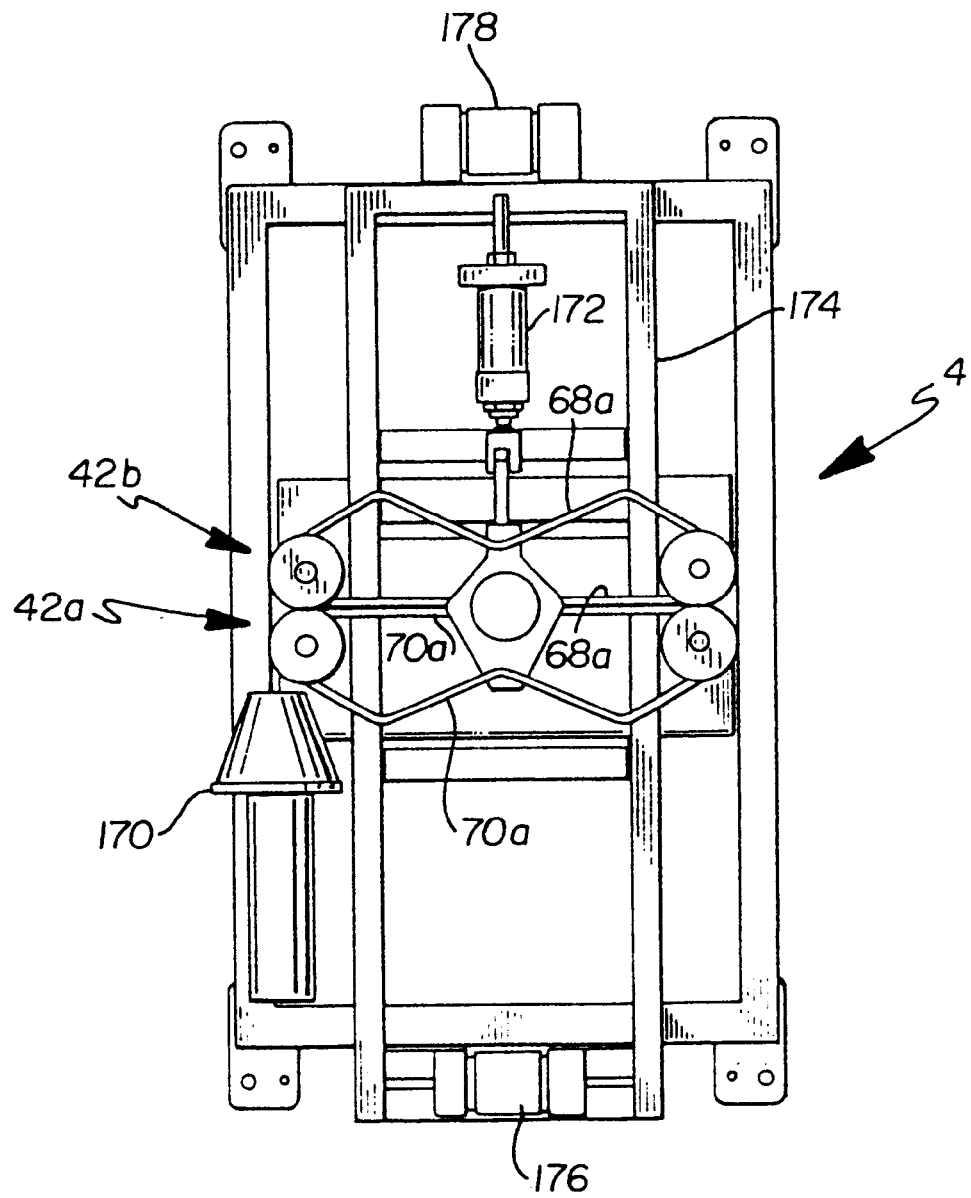
FIG. 9 is a top, plan view of the apparatus of FIG. 7.
Figure 10:
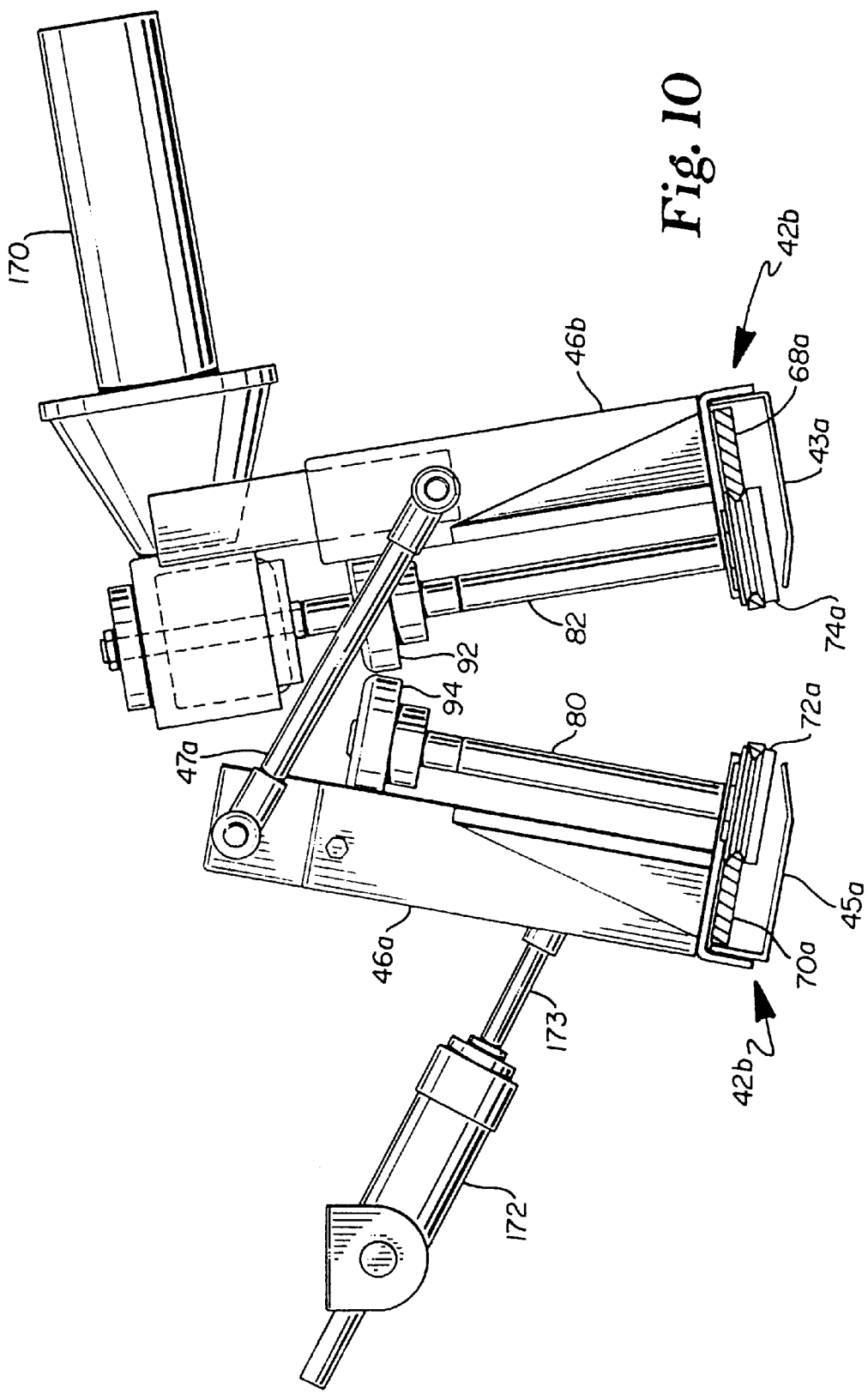
FIG. 10 is a fragmentary, enlarged scale view from the left side of the apparatus showing the bag gripping and opening carriages swung to the open position they will assume in either embodiment.

Also, instead of utilizing a pair of power cylinders 96 mounted directly on the swingable carriage assembly, and thus contributing to the instability of load transmission to the upper load cells, a single power cylinder 172 designated as the carriage cylinder in FIGS. 8 and 9 is utilized. Carriage cylinder 172 is connected between frame 62 and pivotal leg 46a. Tie rod(s) 47a transfers the rotary motion imparted to pivotal leg 46a to pivotal leg 48a and constrains the pivotal legs 46a, 46b to rotate in symmetry with one another. Also, as shown in those figures, not only is carriage cylinder 172 mounted on the upper frame assembly or load cell frame as designated in FIG. 8, but also that cylinder is now mounted centrally of the apparatus, closer to the center of gravity as shown in FIG. 9. This further lessens any unstabilizing effect or uneven distribution of load from the pivotal carriages 42a and 44b, on the upper load cells when an initially filled bag is being held on the carriages, and they swing open to open the bag and complete the filling with a top-off charge.

Figure 7:
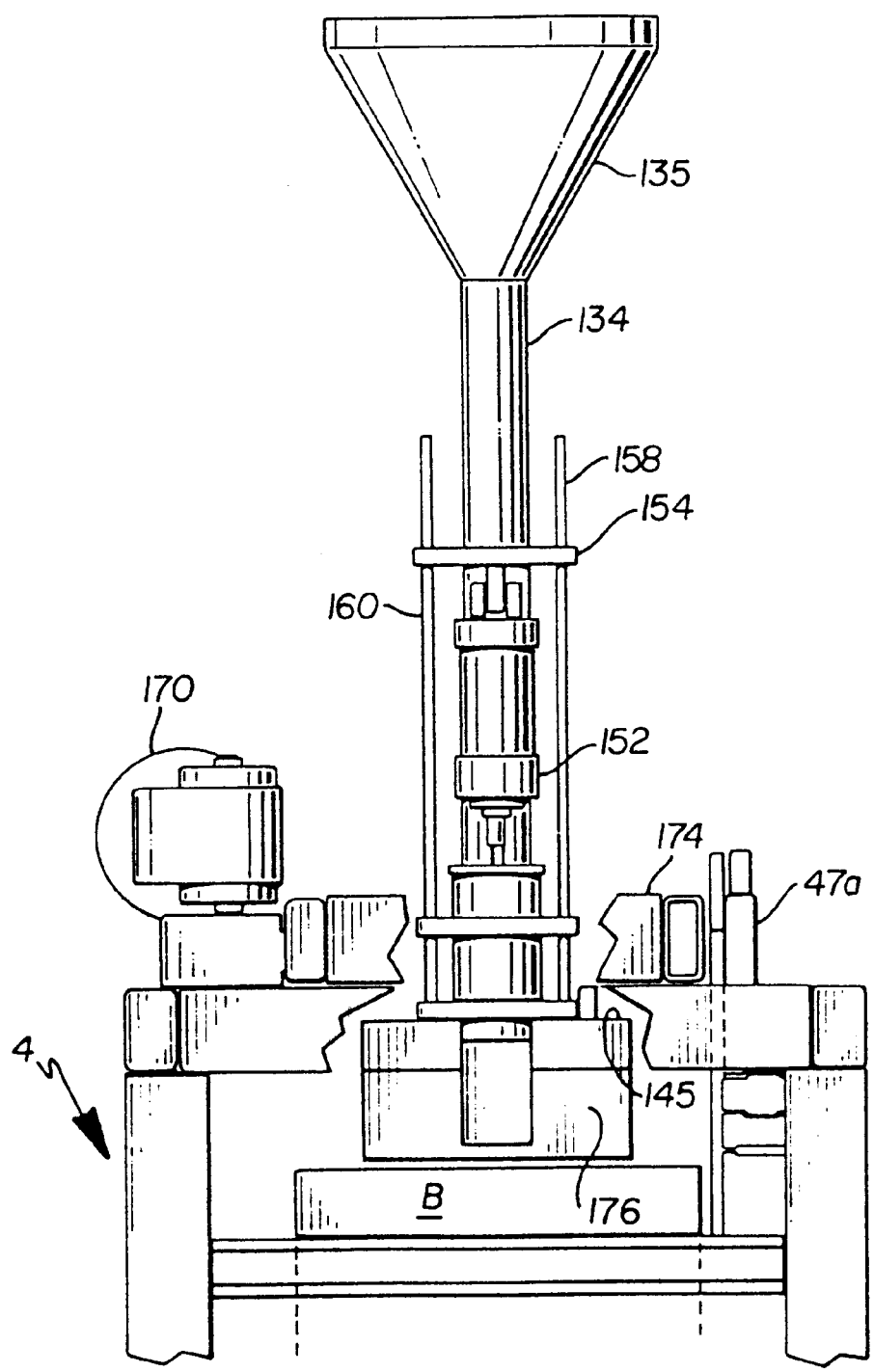
FIG. 7 is a front elevation view of a preferred embodiment utilizing a lowered load cell frame for only two upper load cells.

Finally, the aforesaid improved weight distribution features and lowering of the center of gravity of the swingable carriage assemblies permits the use of only two load cells at the front and back of the upper, load cell frame assembly 174 as shown in FIGS. 7 and 8. Those two load cells are designated by reference numerals 176 and 178 in FIGS. 7, 8, and 9. It is to be noted that those two load cells 176 and 178 are centered at the front and rear of the upper frame assembly, and thus are closer to the center of gravity of the apparatus. This further enhances the stabilization and equalization of weight transmission to the upper load cells. The pivotal carriage assemblies 42a and 42b are swingably supported on transverse pivot shafts, supported on bearings in the same way as described with respect to FIGS. 1–6, so as to transfer the weight load of those carriages and of the upper end of a bag being filled to the upper load cells 176, 178 through load cell frame 174.

The bag top guide and gripping belts 68, 70 are located at the same elevation in the embodiment of FIGS. 7–10, as in the embodiment of FIGS. 1–6. That is accomplished by maintaining the belt housings 43a and 45a, and their drive pulleys 72a and 74a, as shown most clearly in FIG. 10, at the same level in the initially described embodiment.

FIGS. 11–17 illustrate yet another embodiment of the top off station 10, which is actually the preferred embodiment. In this embodiment, the load cell frame 62 is supported upon frame assembly 4 by upper load cells 176, 178 in a substantially identical manner as described above in conjunction with FIGS. 6–10. However, the belt carriages 242 and 244 now comprise a parallelogram linkage which flattens the arc through which the respective belt carriages rotate. In addition, the belt drive motor 170 has been mounted above the load cell frame 62 so as to reduce the moment created by the weight of the belt drive motor about the pivot axis of the belt carriages. Further, to accommodate the new position of the belt drive motor 170, it is preferred to utilize a bag filling machine that is suspended to one side of belt carriages, such as a vibrating plate bag filling machine.

Figure 11:
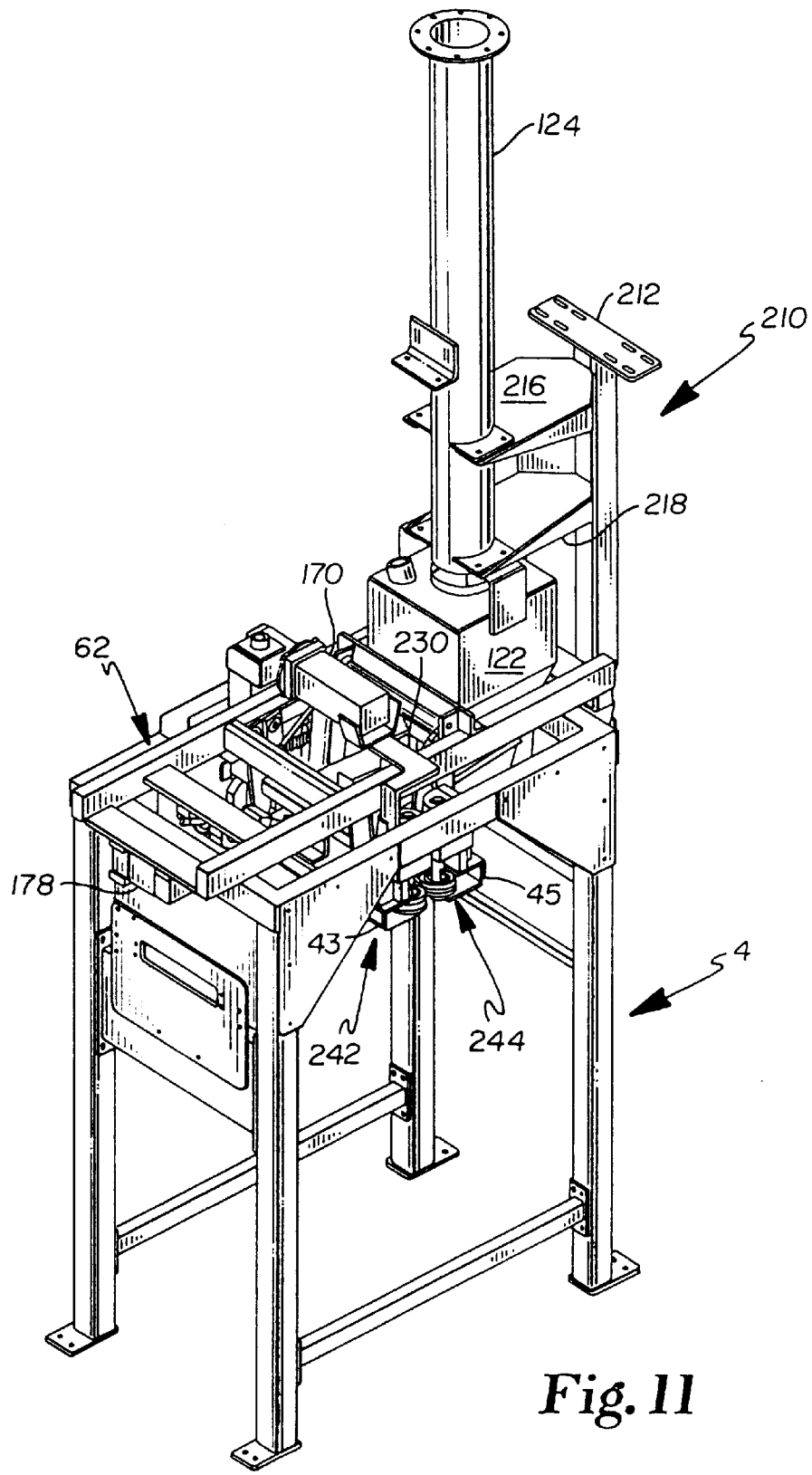
FIG. 11 is a perspective view of an alternate embodiment of the carriage assemblies utilizing a parallel linkage.
Figure 12:
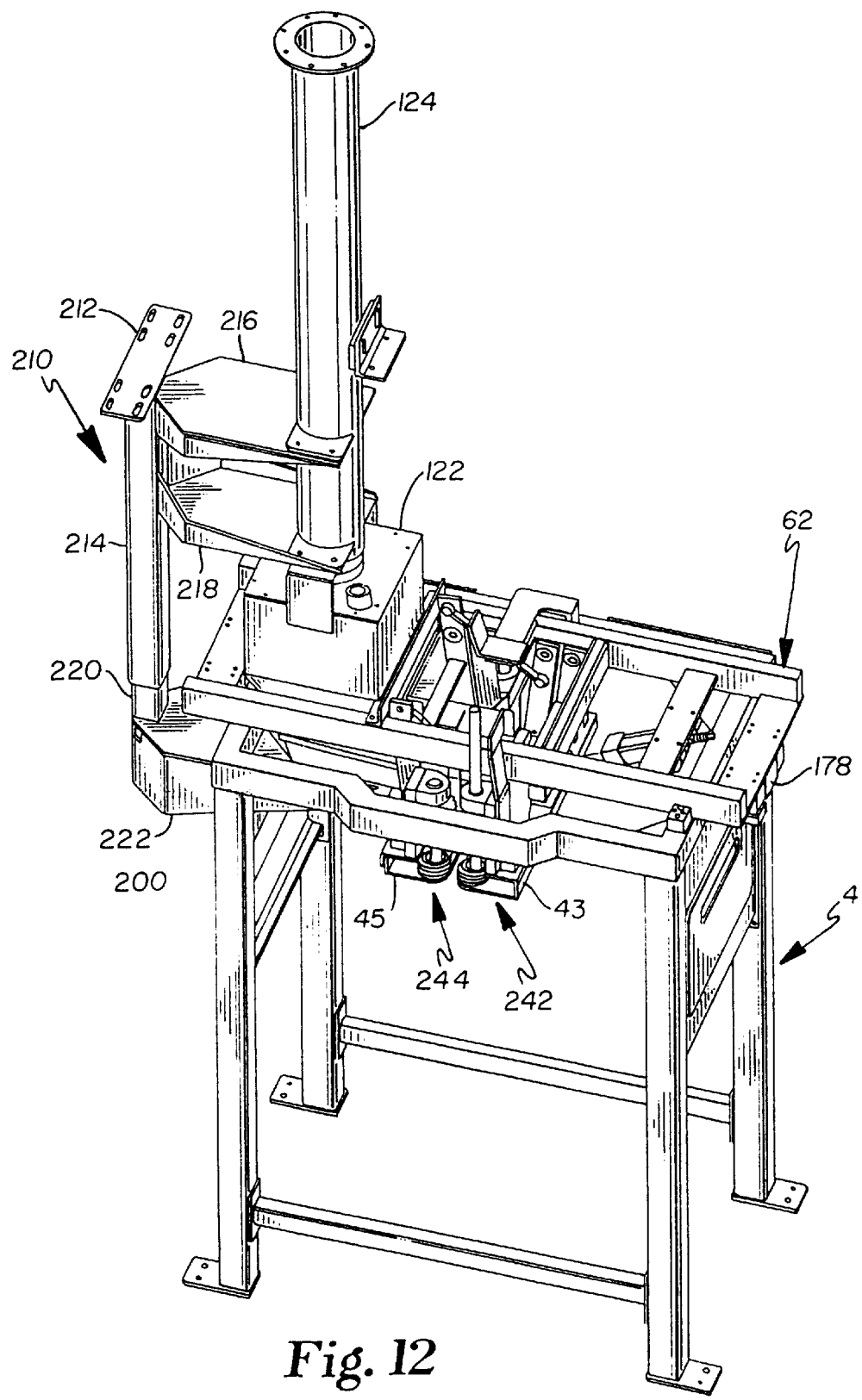
FIG. 12 is a fragmentary perspective view of the apparatus of FIG. 11.
Figure 13:
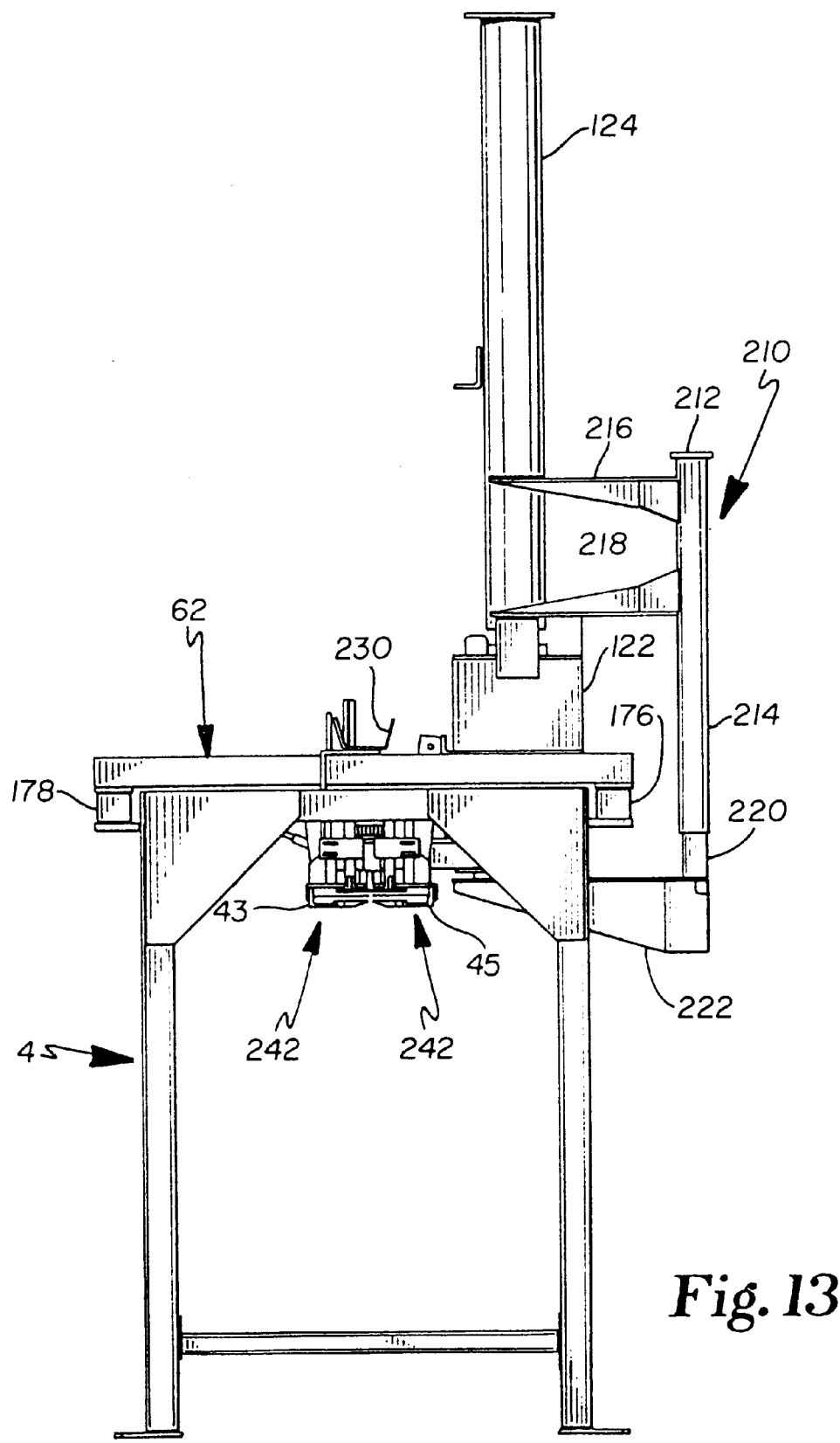
FIG. 13 is a right side elevation of the apparatus of FIG. 11.

The bag filling machine illustrated in FIGS. 11–13 is comprised of an auxiliary supply hopper 122 which is fed through a receiving tube 124. FIGS. 12 and 13 illustrate a vibrating plate 200 which extends from beneath a discharge funnel (not shown) at the bottom of the auxiliary supply hopper 122 to a point between the belt carriages 242, 244. Coupled to the vibrating plate 200 is a motor (not shown) arranged and constructed to impart high frequency vibrations to the vibrating plate 200. The vibrating plate 200 vibrates at relatively high frequencies, and correspondingly low amplitudes, such that particulate materials being transferred from the auxiliary supply hopper 122 to a bag B supported by the receiving conveyer 2 and the belt carriages 242, 244 are not ejected from the vibrating plate 200 during the transfer procedure. The vibrating plate 200 is arranged to slope downward from the auxiliary supply hopper 122 toward the belt carriages 242, 244 at a relatively shallow angle such that when the vibrating plate 200 is still, the particulate material will not flow or slide from the plate 200.

The bag filling machine of the embodiment illustrated in FIGS. 11–13 is supported independently of the frame assembly 4 and load cell frame 62 from frame 210. Frame 210 may be attached to an outer frame assembly 136, such as that illustrated in FIG. 2, by means of flange 212. Vertical support member 214 extends downwardly from flange 212 and has attached thereto brackets 216, 218 which support receiving tube 124 and the auxiliary supply hopper 122. Received within vertical support member 214 is telescoping support member 220 which adjustably supports bracket 222 such that bracket 222 may extend into frame assembly 4 to a position below auxiliary supply hopper 122 and the vibrating plate 200. The bracket 222 supports motor 202 below the vibrating plate 200.

Referring now to FIGS. 14–17, it can be seen that the parallelogram linkage of belt carriages 242, 244 is similar to the pivot legs of belt carriages 42, 44 or 42A, 44A. Pivot legs 246 and 248 of the respective belt carriages 242, 244 are comprised of parallel pivot bars 247 and 249. Pivot bars 247 and 249 are rotatably connected at their respective upper ends to first and second support bars 252, 254, which are themselves secured to respective sides of frame 62. Each housing 43, 45 of the respective belt carriages 242, 244 has affixed to its respective upper surfaces 256a, 256b a pair of connection blocks 258, 260 to which the lower ends of parallel pivot bars 247, 249 are rotatably coupled. Each pivot leg 246, 248 essentially comprises a parallelogram having edges of fixed length. The housings 43, 45 coupled to the lower ends of the pivot legs 246, 248 are thereby constrained to rotate in planar parallel relation with one another. This linkage arrangement causes the carriages 242 and 244 to move outwardly and inwardly along substantially linear paths. As a result, the bag gripping devices 118, 120 pull the opposites sides of a bag B generally straight open without imparting an upward increment of movement to the bag B. Furthermore, the pivot legs 246, 248 are arranged such that the belts exposed upon the inner faces of the housings 43, 45 may contact one another when the pivot legs 246, 248 are rotated together.

The outermost of pivot bars 249 have a projection 249a which extends above the first and second support bars 252, 254. Tie rods 47b are coupled between projections 249a and respective innermost pivot bars 247 so as to constrain the respective belt carriages 244, 246 to move in symmetry with one another as described above. Carriage cylinder 172 and its piston 173 are coupled between the load cell frame 62 and a cross bracket bar 224 extending between outermost pivot bars 247 of pivot legs 248. Carriage cylinder 172 provides the power for swinging the belt carriages 244, 246 towards and away from one another.

In the embodiment of FIGS. 11–17, mounting bracket 230 is fastened to housing 45 by means of bolts (not shown) or by welding. The mounting bracket 230 provides a secure mounting point for the motor 170 which powers the drive shafts 80, 82. The motor 170 is situated generally opposite the housing 45 across the pivot point for belt carriage 244 so as to counter balance the weight of the housing 45. Ideally the moments created by the weight of the motor 170 and the housing 45 will cancel out, making the movement of the belt carriages 244, 246 smoother. However, there is no need to balance the moment of the motor 170 and the moment of the housing 45 as carriage cylinder 172 will provide sufficient force to overcome the small residual moment.

Figure 14:
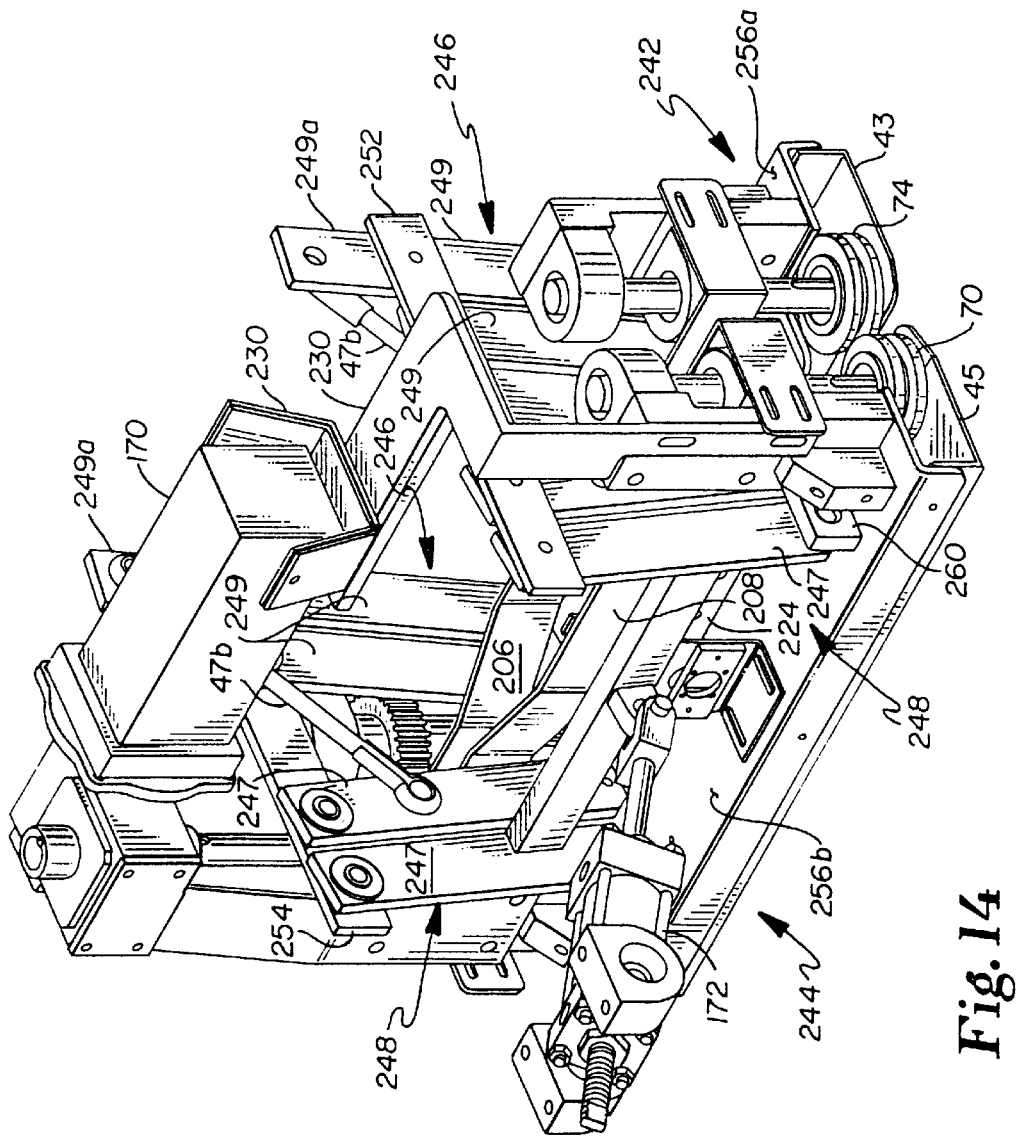
FIG. 14 is a fragmentary perspective view of the carriage assemblies of the apparatus of FIG. 11 as viewed from the rear.
Figure 15:
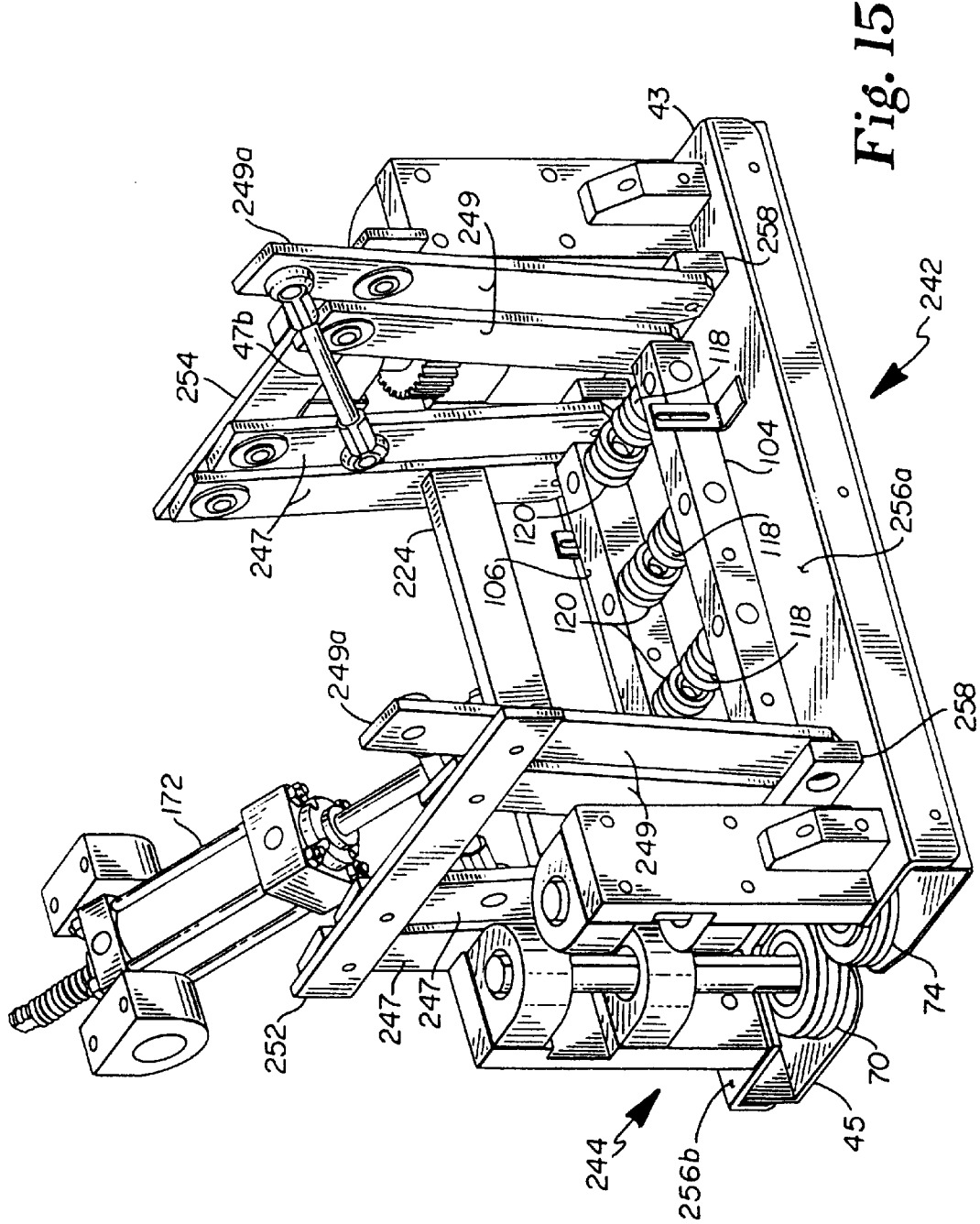
FIG. 15 is a fragmentary perspective view of the carriage assemblies of the apparatus of FIG. 11 as viewed from the rear.
Figure 16:
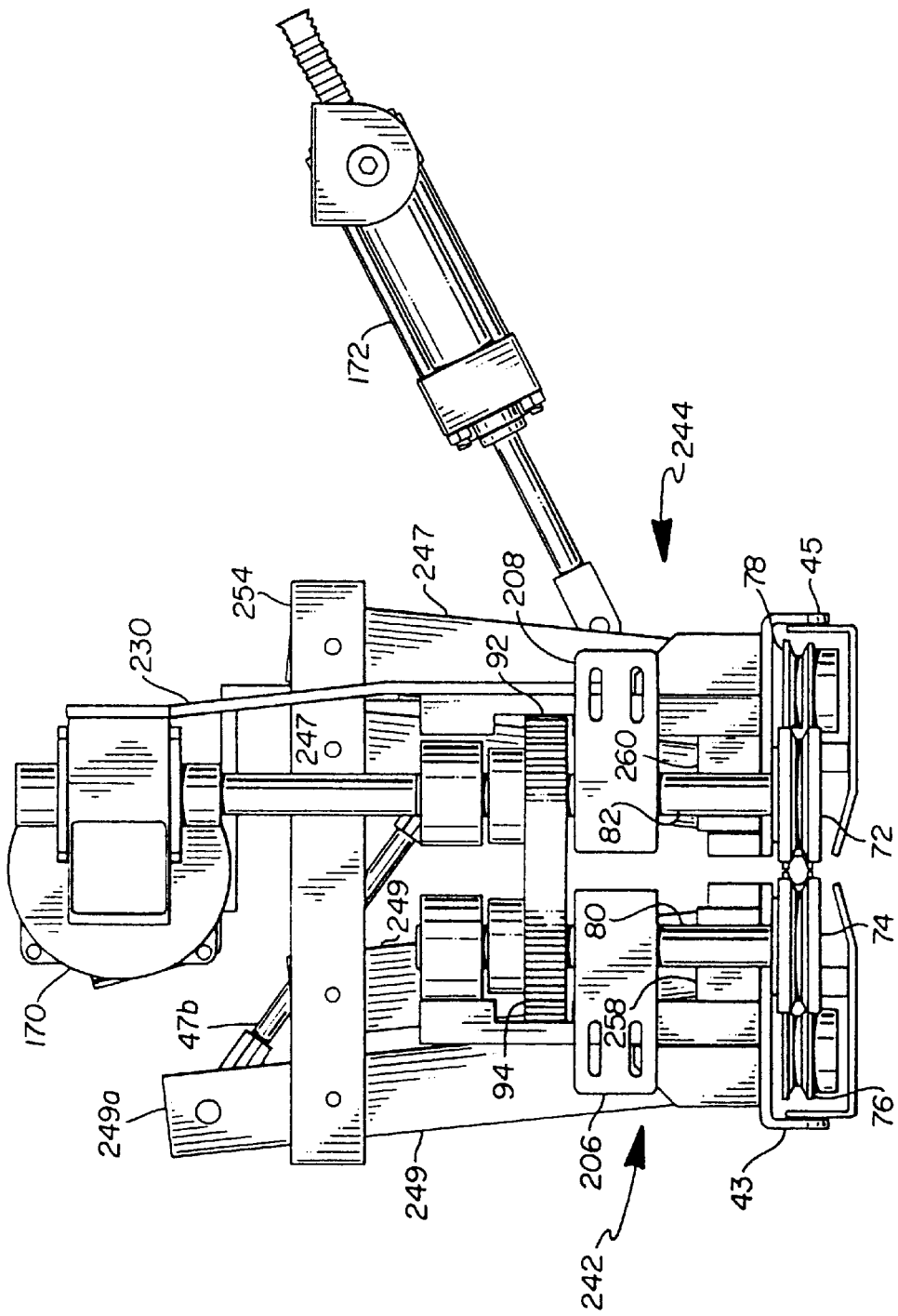
FIG. 16 is a left side elevation of the carriage assemblies of the apparatus of FIG. 11.
Figure 17:
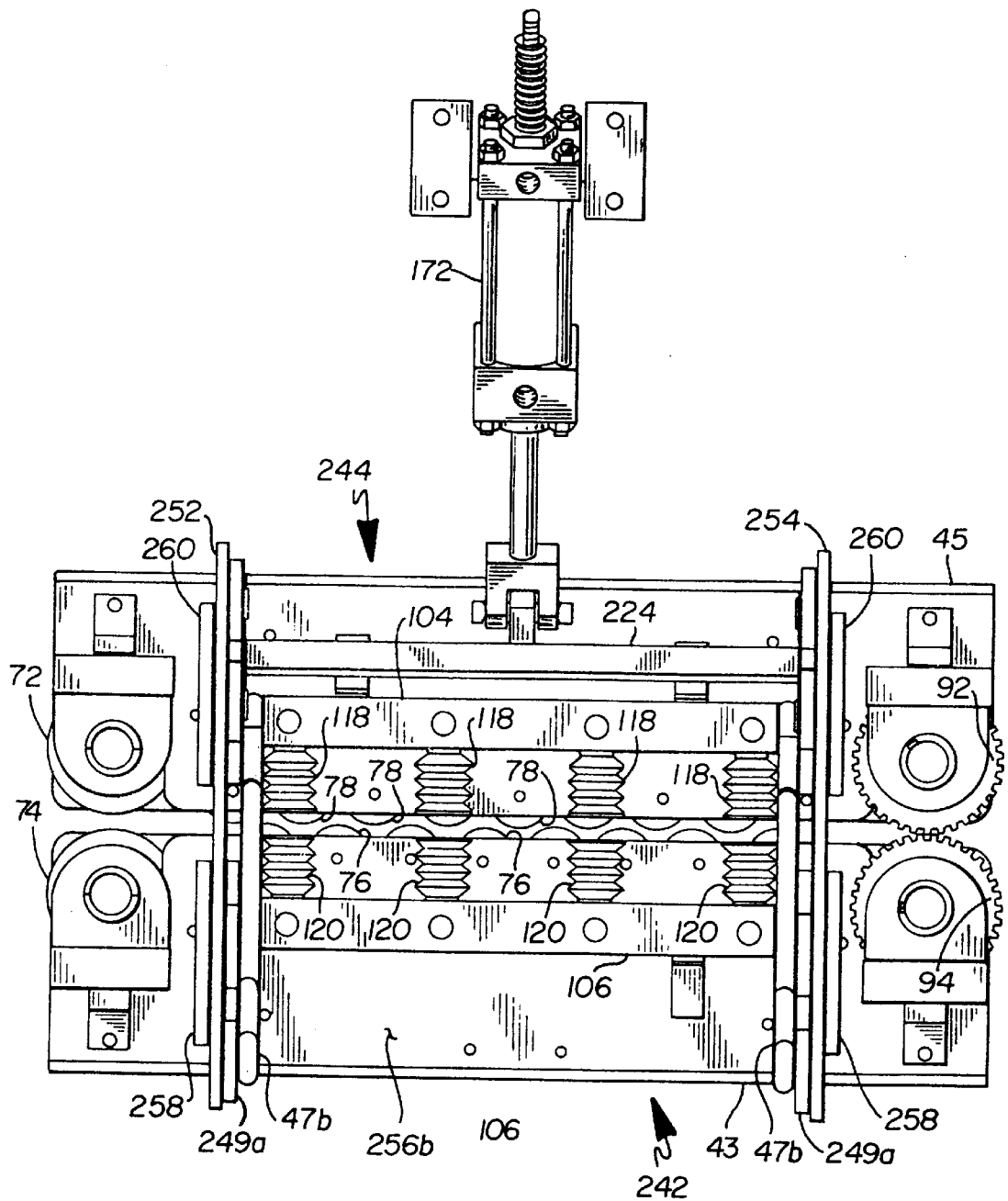
FIG. 17 is a top view of the carriage assemblies of the apparatus of FIG. 11.

FIG. 14 also depicts bag mouth forming bars 206, 208 mounted to each respective belt carriage 242, 244. Bag mouth forming bars 206, 208 act to shape the top of the bag B as the suction cups 118, 120 on vacuum manifolds 104, 106 are actuated to open the top of the bag B. Bag forming bars 206, 204 ensure that the top of bag B will close in the desired manner.

The structure of the delivery conveyor 1, receiving conveyor 2, and lower load cells 16 of the embodiment of FIGS. 11–17 are substantially the same as that of the embodiments of FIGS. 1–10. In addition, the structure of the housings 43, 45 of the embodiment of FIGS. 11–17 is substantially the same as described in conjunction with the embodiments of FIGS. 1–10.

Accordingly, the operation of the top-off and weighing apparatus 10 is the substantially the same in all the embodiments. The top-off operation begins with the transfer of a bag B substantially filled in a high speed, bulk filling operation onto a delivery platform, which may preferably take the form of a conveyor 1. Elevated in-feed plates 12, which are spaced apart to receive a bag therebetween, maintain the top of the bag in a controlled, upright position as the bag is delivered onto receiving conveyor 2. The upper end of the bag is initially received and guided by belts 68 and 70. At this point in the operating cycle, the pivotal carriages 42, 44; 42a, 44a; or 242, 244 are swung to their inwardly pivoted or closed positions as shown in FIGS. 2 and 8. A photoelectric eye or other sensing device is utilized to detect the presence of a bag under the top-off filling hopper and spout 122, 135 or vibrating plate 200; and that sensing device provides a signal stopping the operation of conveyors 1 and 2.

The vacuum supply is then turned on to provide a vacuum or suction effect at suction cups 118 and 120, through vacuum manifolds 104 and 106. Cylinders 114, 116 are then actuated to slide the vacuum manifolds 188, 120 inwardly toward the respective faces of the bag B, thereby bringing the vacuum cups 104, 106 into contact with the faces of the bag B. Thus, opposed vacuum cups 104 and 106 grip and hold the opposite faces of a bag B along its top. Thereafter, either the dual cylinders 96 of the first embodiment, or the single carriage cylinder 172 of the embodiments of FIGS. 7–10 and FIGS. 11–17 are actuated so as to swing the carriages 42, 44; 42a, 44b; or 242, 244 to the open position shown in FIG. 10. Thus, with the opposite faces of the bag top being held by the suction devices, the bag mouth is pulled open to receive a top-off charge. Thereafter, the fill spout cylinder 152 or 152a is actuated to extend its piston and lower the discharge spout 145 into the top of the bag. This lowered position of the fill spout 145 is shown in FIGS. 5 and 8, with the upper, raised position of the fill spout also being shown in those views. In the embodiment of FIGS. 11–17, there is no such fill spout cylinder 152, 152a.

Next, the dispensing of a top-off charge into the bag is commenced, by actuating the material delivery mechanism, such as vertical auger 132 or vibrating plate 200. As pointed out above, other types of material delivery devices, such as a horizontal auger, or a vibrating plate may be utilized to dispense material from an auxiliary supply hopper into the top of the bag in the top-off operation, depending upon the particular characteristics of the material being filled into a bag.

At this point in the operating cycle, the combined upper and lower load cells operate to control the accurate dispensing of the top-off charge into the bag. The bulk of the bag weight is registered on the lower load cells positioned under the receiving conveyor 2. The upper load cells, either 162 and 164, or 176 and 178, sense a very small portion of the bag material and its weight, and in particular that added, top-off portion of the material which is dispensed into the top of the bag, such as through auger tube 130 or vibrating plate 200. The top-off weight must be accurately controlled. For a desired, 100 pound bag material weight, the additional top-off charge will be between 1 and 3 pounds, for example. A computer or CPU as indicated by reference numeral C in FIG. 2 is connected to both the upper and lower load cells and receives signals from both of them. That computer compares and integrates the weight signals from both sets of load cells in order to accurately control the dispensing of the top-off charge in the proper amount. When the computer senses that the top-off charge has been fully dispensed into the bag in the desired amount, it sends a signal to stop the top-off charge delivery mechanism, whether it be an auger or a vibrating plate.

Next, the fill spout 145, if used, is retracted upwardly, by the lifting action of cylinder 152 or 152a on the slidable sleeve 144. Thereafter, the carriage swing cylinder(s) 96 or 172 are actuated to swing the belt carriages 42, 44 or 42a, 44b inwardly, to their closed positions to discharge the filled bag B and to receive the next bag B. When the belt carriages 42, 44; 42a, 44b; or 242, 244 have closed, the vacuum is cut off from vacuum manifolds 106, 108 and cylinders 114, 116 are actuated to slide the manifolds 106, 108 away from the faces of the bag B. The drive belts 68,70 of the belt carriages 42, 44 or 42a, 44a are actuated by energizing the belt drive motor 84 or 170. The frictional engagement of the belts 68, 70 with the top of the bag B, in conjunction with action of receiving conveyor 2, conveys the bag outwardly on conveyor 2, or to the left as viewed in FIG. 1, to deliver the fully-charged bag onto exit or discharge conveyor 14. Thereafter, the bag B is delivered to a bag-closing station (not shown) to have its top closed. Stitching, glue, or heat sealing may be used in conventional manners to close the bag top.

The use of two sets of load cells, upper, and lower, as described herein, with their weight signals being integrated and processed by a single computer, provides an extremely efficient and accurate delivery of a top-off charge into a bulk filled bag.

That aforesaid novel feature of the two sets of weight cells, has been effectively combined with the bag handling devices disclosed herein to completely hold and control the top end of a bag from the time that an upright bag is delivered from an initial bag filling station, to the top-off and weighing station 10. As noted above, those devices include the bag receiving and guide belts 68 and 70, as well as the in-feed guide plates 12.

As the structure of the present invention may be manifested in numerous different embodiments not herein described, it will be understood that the disclosure contained herein is by way of example only and is not to be construed to limit the present invention to just those structures described.

What is claimed is:

1. A device for topping-off a substantially filled bag with a final charge of particulate material to provide a predetermined total charge weight in the bag, the device comprising:

a lower frame supported upon a plurality of lower load cells, the lower frame having mounted thereon a receiving platform which supports most of the weight of an initially filled bag received thereon;

an upper frame supported above the lower frame upon a plurality of upper load cells;

a pair of carriage assemblies suspended from the upper frame and movable towards and away from each other between open and closed positions;

a plurality of bag grasping means mounted upon the respective carriage assemblies so as to be able to grasp and hold the opposed faces of the bag received between the carriage assemblies and further being capable of opening the bag as the carriage assemblies are moved away from one another to their open position, whereby a portion of the weight of an initially filled bag and of a top-off charge of material added to the bag is supported by the upper frame and thereby transferred to the upper load cells;

a filling mechanism supported independent of the upper and lower frames, the filling structure positioned to supply a predetermined charge of particulate material to an open bag; and a signal processor connected to the lower and upper load cells for integrating electrical weight signals received therefrom, the signal processor being capable of calculating an actual weight of the bag, of determining the difference between the actual weight of the bag and the final charge weight, and of actuating the filling mechanism to supply a charge of particulate material to the bag to attain the predetermined total charge weight.

2. The device for topping-off a substantially filled bag of claim 1 wherein each of the carriage assemblies further comprise:

a pair of pivot legs pivotally suspended from a pivot shaft that is coupled to the upper frame.

3. The device of claim 1 wherein each of the upper and lower frames are supported upon at least two load cells.

4. The device for topping-off a substantially filled bag of claim 1 wherein the upper frame is supported upon two load cells.

5. The device for topping-off a substantially filled bag of claim 1 wherein the carriage assemblies are rotatable mounted and constrained to rotate in symmetry with one another by at least one tie rod coupled between the respective carriage assemblies.

6. The device for topping-off a substantially filled bag of claim 5 wherein the carriage assemblies are rotated toward and away from one another by at least one carriage cylinder having a first end affixed to the upper frame and a second end coupled to a carriage assembly.

7. The device for topping-off a substantially filled bag of claim 5 wherein the carriage assemblies are rotated toward and away from one another by at least one carriage cylinder having a first end coupled to a first carriage assembly and a second end coupled to a second carriage assembly.

8. The device for topping-off a substantially filled bag of claim 1 further comprising a pair of housings, each of the housings of the pair being supported by a respective carriage assembly, each housing having disposed therein a belt, the belts being capable of linear motion, the belts being exposed on an inner face of each housing such that when the carriage assemblies are moved to their closed position, the respective belts meet engage the opposed faces of a bag.

9. The device for topping-off a substantially filled bag of claim 8 wherein the housings operate in a complementary manner and wherein the housings further comprise:

respective serpentine belts received upon a plurality of pulleys mounted within the respective housings, at least one of the pulleys of each housing being a drive pulley, the respective drive pulleys being mounted upon, and driven by, respective drive shafts which extend out of each of the housings;

respective spur gears affixed to each of the drive shafts of the housings, the respective spur gears mating when the housings are moved into contact with one another; and a motor mounted upon one of the housings, the motor inducing linear motion in the respective serpentine belts of the complementary housings by providing motive power to the drive shaft of the belt of the housing upon which the motor is mounted, the motive power being transferred to the belt of the complementary housing through the mating of the spur gears affixed upon the respective drive shafts of the housings when the housings are rotated into contact with one another.

10. The device for topping-off a substantially filled bag of claim 1 wherein the receiving plate form comprises a conveyor.

11. The device of claim 1 wherein the bag grasping means comprise a plurality of vacuum suction devices mounted upon and in fluidic connection with a pair of vacuum manifolds that are slidably mounted upon the respective housings, the vacuum manifolds having associated therewith means for inducing a vacuum therein and hence, in the vacuum suction devices, the respective vacuum manifolds being also coupled to respective cylinders, the cylinders being arranged to slide the vacuum manifolds towards and away from the inner face of the housings, the vacuum suction devices being capable of engaging the opposing faces of a bag received between the housings when the vacuum manifolds are in a closed position adjacent the inner face of the housings.

12. The device of claim 1 wherein the fill spout comprises a vertical auger bag filling machine.

13. A method of achieving, within an acceptable margin of error, a total charge weight of particulate material contained within a bag, the method comprising the steps of:

conveying a bag containing a preliminary charge weight of particulate material onto a receiving platform supported upon a plurality of load cells;

engaging the opposing faces of the bag between a pair of carriage assemblies, the carriage assemblies being suspended from a frame that is supported by a plurality of upper load cells;

grasping the opposing faces of the bag with a plurality of grasping means mounted upon the carriage assemblies after the opposing faces of the bag have been fully engaged by the carriage assemblies;

moving the carriage assemblies away from each other to open the top of the bag;

recording a first electronic signal from the plurality of the lower load cells supporting the receiving platform that corresponds to the weight of the bag supported upon the receiving platform;

recording a second electronic signal from the plurality of the upper load cells supporting the carriage assemblies upon which the grasping means are mounted that corresponds to the portion of the weight of the bag and preliminary charge weight supported by the carriage assemblies;

integrating the first and second electronic signals to determine the preliminary charge weight and to determine the difference between the total charge weight and the preliminary charge weight, if any;

causing a fill spout to add a quantity of particulate material to the bag based upon the difference between the final charge weight and the preliminary charge weight;

repeating the recording, weighing and integrating steps as needed to achieve the final charge weight of particulate material within the bag;

rotating the carriage arms towards one another to re-engage the opposing faces of the now filled bag between the carriage assemblies and close the top of the bag;

disengaging the grasping means from the opposing faces of the bag; and conveying the filled bag from the receiving conveyor to a bag closing station.

14. A device for topping-off a substantially filled bag with a final charge of a particulate material to provide a predetermined final charge weight in the bag, the device comprising:

a lower frame supported upon a plurality of lower load cells, the lower frame having mounted thereon a receiving platform;

an upper frame supported above the lower frame upon a plurality of upper load cells;

a pair of carriage assemblies suspended from the upper frame and movable towards and away from each other between open and closed positions, the carriage assemblies constrained to rotate in symmetry with one another by a tie rod coupled between the respective carriage assemblies, the movement being enabled by at least one carriage cylinder having a first end affixed to the upper frame and a second end coupled to one of the carriage assemblies;

a pair of housings, each of the housings of the pair being supported from a respective carriage assembly, each housing having disposed therein a belt, the belts being capable of linear motion, the belts being exposed on an inner face of each housing such that when the carriage assemblies are rotated toward one another, the respective belts meet one another and are able to engage the opposed faces of a bag;

a plurality of bag grasping means, the bag grasping means being mounted upon the respective housings so as to be able to grasp and hold the opposed faces of the bag received between the belts of each housing and further being capable of opening the bag as the housings are rotated away from one another;

a fill spout supported independent of the upper and lower frames, the fill spout being capable of being lowered into an open bag supported by the bag grasping means of the upper frame and the receiving conveyor of the lower frame, the fill spout being further capable of supplying a predetermined charge of particulate material to the open bag; and a signal processor for integrating electrical signals received from the plurality of load cells of the respective upper and lower frames, the signal processor further being capable of calculating an actual weight of the bag, of determining the difference between the actual weight of the bag and an ideal weight, and of directing the fill spout to supply a charge of particulate material to the bag to attain the desired final charge weight.

15. The device for topping-off a substantially filled bag of claim 14 wherein each of the upper and lower frames are supported upon at least two load cells.

16. The device for topping-off a substantially filled bag of claim 14 wherein the upper frame is supported upon two load cells.

17. The device for topping-off a substantially filled bag of claim 14 wherein the housings operate in a complementary manner and wherein the housings further comprise:

respective serpentine belts received upon a plurality of pulleys mounted within the respective housings, at least one of the pulleys of each housing being a driven drive pulley, the respective drive pulleys being mounted upon, and driven by, respective drive shafts which extend out of each of the housings;

respective spur gears affixed to each of the vertical drive shafts of the housings, the respective spur gears mating when the belts of the housings are rotated into contact with one another; and a motor mounted upon one of the housings, the motor providing motive power to induce linear motion in the serpentine belts of the complementary housings by providing motive power to the drive shaft of the belt of the housing upon which the motor is mounted, the motive power be transferred to the belt of the complementary housing through the mating of the spur gears affixed upon the respective drive shafts of the belts of the housings when the housings are rotated into contact with one another.

18. The device for topping-off a substantially filled bag of claim 14 wherein the bag grasping means comprise a plurality of vacuum suction devices mounted upon and in fluidic connection with a pair of vacuum manifolds that are slidably mounted upon the respective housings, the vacuum manifolds having associated therewith means for inducing a vacuum therein and hence, in the vacuum suction devices, the respective vacuum manifolds being also coupled to respective cylinders, the cylinders being arranged to slide the vacuum manifolds towards and away from the inner face of the housings, the vacuum suction devices being capable of engaging the opposing faces of a bag received between the housings when the vacuum manifolds are in a closed position adjacent the inner face of the housings.

19. The device for topping-off a substantially filled bag of claim 14 wherein the fill spout comprises a vertical auger bag filling machine.

20. The device for topping-off a substantially filled bag of claim 14 wherein the receiving platform comprises a conveyor.

* * * * *